United States Patent
Brown, Jr.

(10) Patent No.: US 6,870,473 B2
(45) Date of Patent: Mar. 22, 2005

(54) CORNER-POST MOUNTED, STATUS LIGHT DISPLAY FOR A SEMI-TRAILER

(75) Inventor: James B. Brown, Jr., Village of Lakewood, IL (US)

(73) Assignee: Wabash National, L.P., Lafayette, IN (US)

( * ) Notice: Subject to any disclaimer, the term of this patent is extended or adjusted under 35 U.S.C. 154(b) by 24 days.

(21) Appl. No.: 10/632,325

(22) Filed: Aug. 1, 2003

(65) Prior Publication Data

US 2004/0124973 A1 Jul. 1, 2004

Related U.S. Application Data

(60) Provisional application No. 60/400,142, filed on Aug. 1, 2002.

(51) Int. Cl.[7] .................................................. B60Q 1/26
(52) U.S. Cl. ........................ 340/463; 340/435; 340/438; 340/686.6
(58) Field of Search ................................ 340/463, 903, 340/435, 436, 438, 686.1, 686.6, 687, 691.6; 307/10.8, 9.1

(56) References Cited

U.S. PATENT DOCUMENTS

| | | | | |
|---|---|---|---|---|
| 4,277,804 A | * | 7/1981 | Robison | 348/148 |
| 4,857,807 A | * | 8/1989 | Hargis | 315/77 |
| 5,574,426 A | * | 11/1996 | Shisgal et al. | 340/435 |
| 6,114,950 A | * | 9/2000 | Schaible et al. | 340/435 |
| 6,604,592 B2 | * | 8/2003 | Pietsch et al. | 180/168 |
| 6,693,524 B1 | * | 2/2004 | Payne | 340/463 |
| 6,737,962 B2 | * | 5/2004 | Mayor | 340/431 |
| 6,799,814 B2 | * | 10/2004 | Lesesky et al. | 303/122.02 |

* cited by examiner

Primary Examiner—John Tweel, Jr.
(74) Attorney, Agent, or Firm—Trexler, Bushnell, Giangiorgi, Blackstone & Marr, Ltd.

(57) ABSTRACT

A system having dual functionality implemented on a semi-trailer is provided. The system includes a sensor attached to a rear of the semi-trailer, a processing and display assembly, other systems associated with the semi-trailer, and wiring connected therebetween. The wiring may also be connected to other systems associated with the semi-trailer. The sensor senses the distance between a back end of the semi-trailer and an object behind the semi-trailer. Based on the distance sensed, the processing and display assembly flashes colored lights, visible to the semi-trailer driver, to inform the driver of the distance to an object behind the semi-trailer. The processing and display assembly also monitors the status of other systems associated with the semi-trailer. Based on the status, the processing and display assembly continuously shines colored lights, visible to the semi-trailer driver, to inform the driver of the status of the other systems.

26 Claims, 7 Drawing Sheets

CORNER-POST MOUNTED, STATUS LIGHT DISPLAY FOR A SEMI-TRAILER

CROSS-REFERENCE

This patent application claims the benefit of domestic priority of U.S. Provisional Application Ser. No. 60/400,142, filed Aug. 1, 2002, and entitled "Corner-Post Mounted, Status Light Display For A Semi-Trailer".

BACKGROUND OF THE INVENTION

The present invention relates to a system that provides information to a driver of a cab connected to a semi-trailer of distance to an object behind the semi-trailer and the status of other systems associated with the semi-trailer.

Prior to goods being loaded into a semi-trailer at a first location or unloaded therefrom in a second location, a driver, who is located in a cab which is connected to the semi-trailer, often must back the semi-trailer up to a loading/unloading dock. Problems have arisen in such practice as the rear of the semi-trailer is positioned a substantial distance away from the driver such that the driver may not be able to adequately see the dock for a number of reasons, for instance, a lack of lighting at the rear of the semi-trailer or at the dock. Thus, the driver will sometimes accidentally back the semi-trailer into the dock causing damage to the semi-trailer, the dock or both.

Semi-trailer drivers also have problems which are connected to judging distance behind the semi-trailers when the semi-trailers are on the road. For instance, drivers of other vehicles on the road typically tailgate semi-trailers such that the driver may not be able to see the vehicles behind the semi-trailers at certain times. Such practice by these vehicles could possibly lead to accidents between the vehicles and the semi-trailers when the driver of the cab is not aware that the vehicles are positioned extremely close behind the semi-trailer.

Semi-trailers also have a number of other known systems associated therewith, such as anti-lock braking systems (ABS) warning lights and tire inflation warning lights. Semi-trailer drivers also need to keep a close eye on the status of these other systems associated with the semi-trailer while driving to ensure the proper operation of the semi-trailer, as well as the safety of the drivers and those in close proximity to the semi-trailer.

One system that is known in the prior art which provides the status of an operating system on a trailer to the driver is a status light provided on a refrigerated trailer. The status light is an optional device and is not integral to the operation of the refrigeration system. The light is mounted on a bracket in proximity to the corner post of the semi-trailer. The light shows that the refrigeration unit is operating as intended and will also show when the refrigeration unit has malfunctioned or is not operating within its intended temperature range.

This prior art system, though, has a number of disadvantages. First, the status light protrudes from the semi-trailer such that the status light is prone to damage. Second, the status light is only an optional device and is only designed for operation with a refrigeration unit. Finally, the status light shines brightly in darkness such that it can be a nuisance to the driver.

Thus, there is a need for a system which can alert the semi-trailer driver of the proximity of the back end of the semi-trailer to other structures, such as a dock or another vehicle. The present invention provides such a system.

There is also a need for a system which can alert the semi-trailer driver of the status of other systems associated with the semi-trailer, and which overcomes the disadvantages of the known prior art. The present invention also provides such a system.

OBJECTS AND SUMMARY

A primary object of the present invention is to provide a system which functions to provide a semi-trailer driver with information relating to the distance to an object behind the semi-trailer.

Another primary object of the present invention is to provide a system which functions to provide a semi-trailer driver with status information relating to systems associated with the semi-trailer.

A further primary object of the present invention is to provide a system which functions to provide a semi-trailer driver with information relating to both the distance to an object behind the semi-trailer and relating to systems associated with the semi-trailer.

An object of the present invention is to provide a system which alerts a semi-trailer driver when objects are detected within different predetermined distances of the rear of the semi-trailer.

Another object of the present invention is to provide a system which alerts a semi-trailer driver when objects are detected within different predetermined distances of the rear of the semi-trailer, and which functions in both forward and reverse.

Yet another object of the present invention is to provide a display unit which is recessed in the semi-trailer such that damage to the display from the outside is virtually eliminated.

Briefly, and in accordance with the foregoing, the present invention provides a system having dual functionality implemented on a semi-trailer. The system generally includes a sensor attached to a rear of the semi-trailer, a processing and display assembly and a wire assembly connected therebetween. The wire assembly may also be connected to other systems associated with the semi-trailer. The sensor senses the distance between a back end of the semi-trailer and an object behind the semi-trailer. Based on the distance sensed, the processing and display assembly flashes lights, visible to a driver in a cab connected to the semi-trailer, to inform the driver of the distance to an object behind the semi-trailer. The processing and display assembly also processes and indicates the status of other systems associated with the semi-trailer. Based on the status, the processing and display assembly continuously shines lights, visible to the driver, to inform the driver of the status of the other systems.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
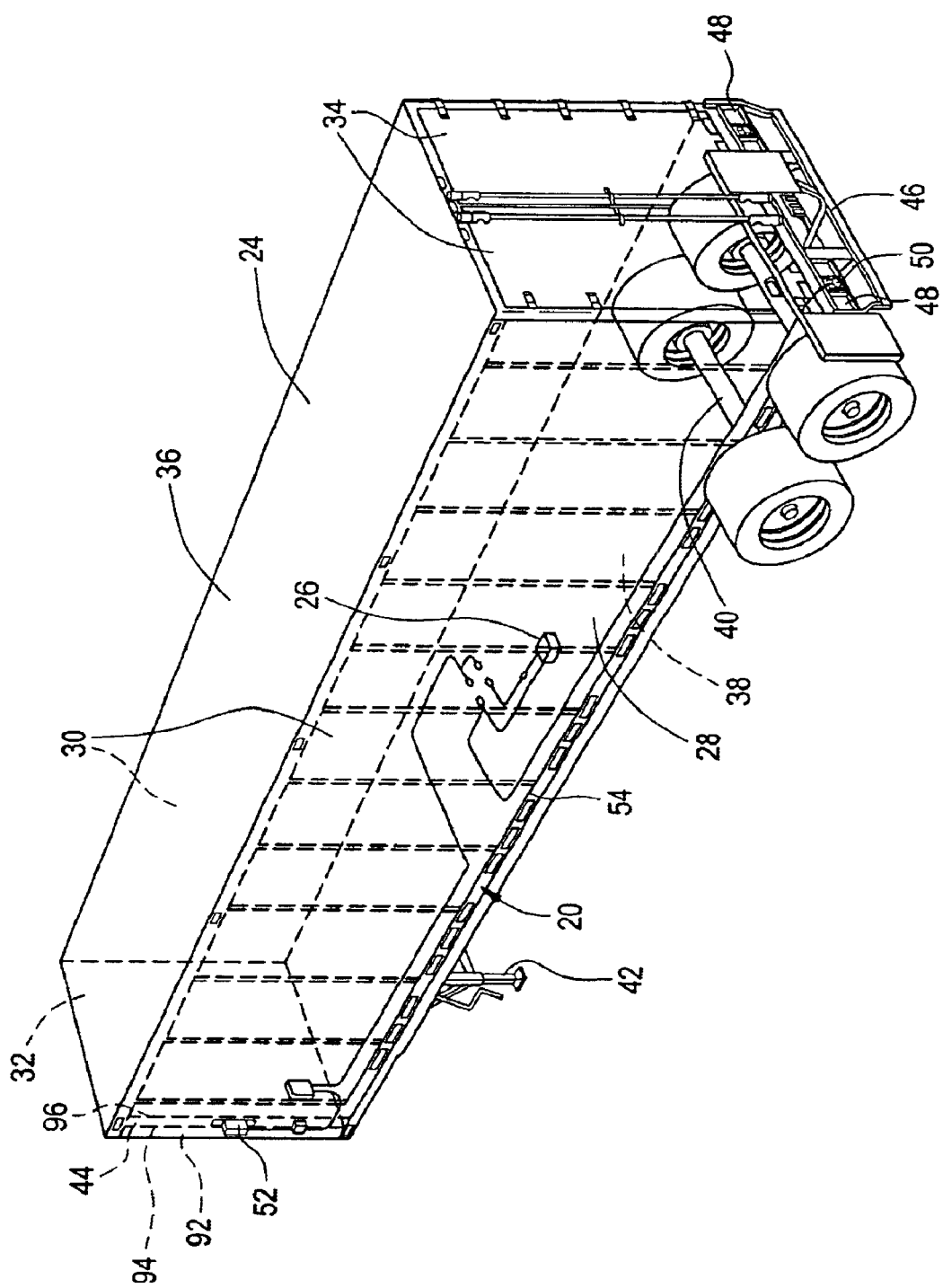
FIG. 1 is a perspective view of semi-trailer, with portions shown in phantom lines, including a system of the present invention.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

A system 20 of the present invention provides information to a driver who is seated in a cab 22 connected to a semi-trailer 24 of distance to an object (not shown) behind the semi-trailer 24 and the status of other systems 26 associated with the semi-trailer 24.

Figure 2:
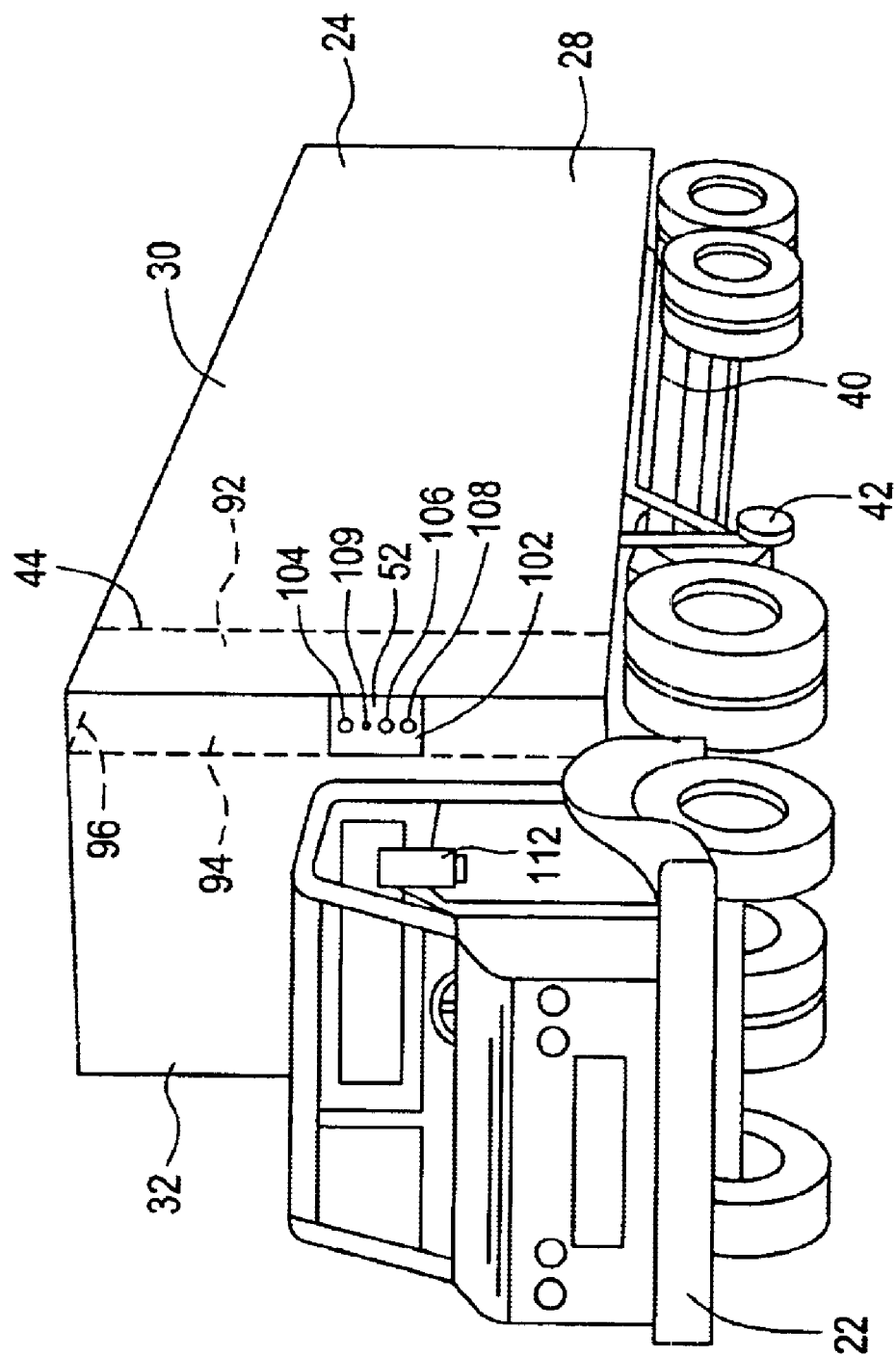
FIG. 2 is a perspective view of a cab and a semi-trailer which includes the system of the present invention.

The semi-trailer 24 is best illustrated in FIGS. 1 and 2 and is connected to the cab 22 by conventional means. The semi-trailer 24 includes a body 28 formed from a pair of rectangular sidewalls 30, a front wall 32, rear doors 34, a top panel or roof 36 and a floor 38. The floor 38 is supported by a conventional rear undercarriage assembly 40 and has a landing gear 42 secured thereunder. Corner posts 44, preferably made of extruded aluminum, are positioned within the body 28 of the semi-trailer 24 at the connection of the front wall 32 to each of the sidewalls 30 and at the connection of the rear doors 34 to each of the sidewalls 30 (only the corner post 44 which is provided at the connection of the front wall 32 to the sidewall 30 on the driver's side of the cab 22 is illustrated). A bumper assembly 46 is positioned at the back-end of the semi-trailer 24 below the rear doors 34 and carries the tail lights 48 for the semi-trailer 24.

The system 20, which is illustrated in FIG. 1, generally includes a sensor 50, a status light processing and display assembly 52, the other systems 26 associated with the semi-trailer 24, and an interconnecting wiring 54.

Figure 6:
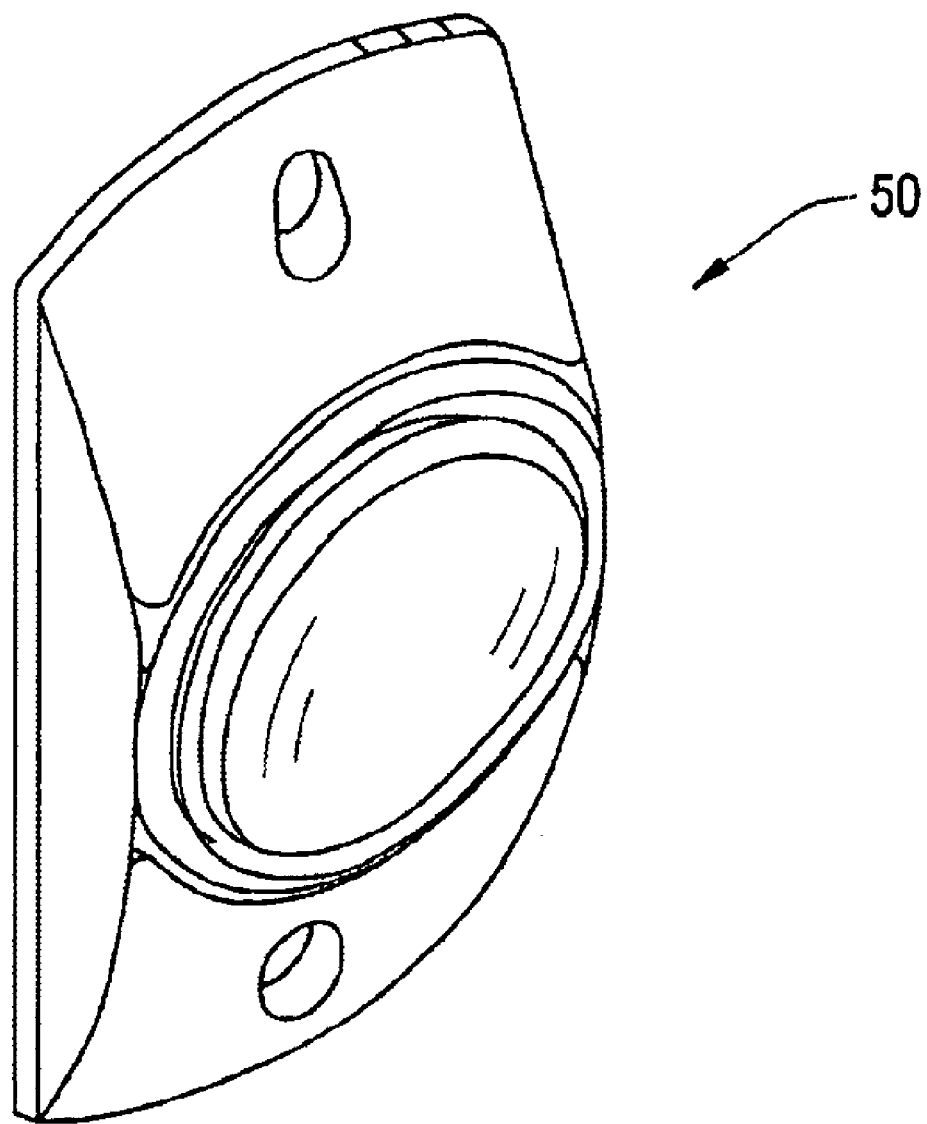
FIG. 6 is a perspective view of a sensor of the system of the present invention.

The sensor 50 is illustrated in FIG. 6 and is preferably connected to the bumper assembly 46 of the semi-trailer 24 on the driver's side of the semi-trailer 24 by conventional means. The sensor 50 determines a distance between the sensor 50 (at the back of the semi-trailer 24) and an object (not shown) behind the semi-trailer 24. The sensor 50 is preferably an ultrasonic sensor, but could also be in the form of a laser sensor, an infrared sensor, a capacitance sensor, or any other type of sensor which is capable of sensing distance.

Figure 7:
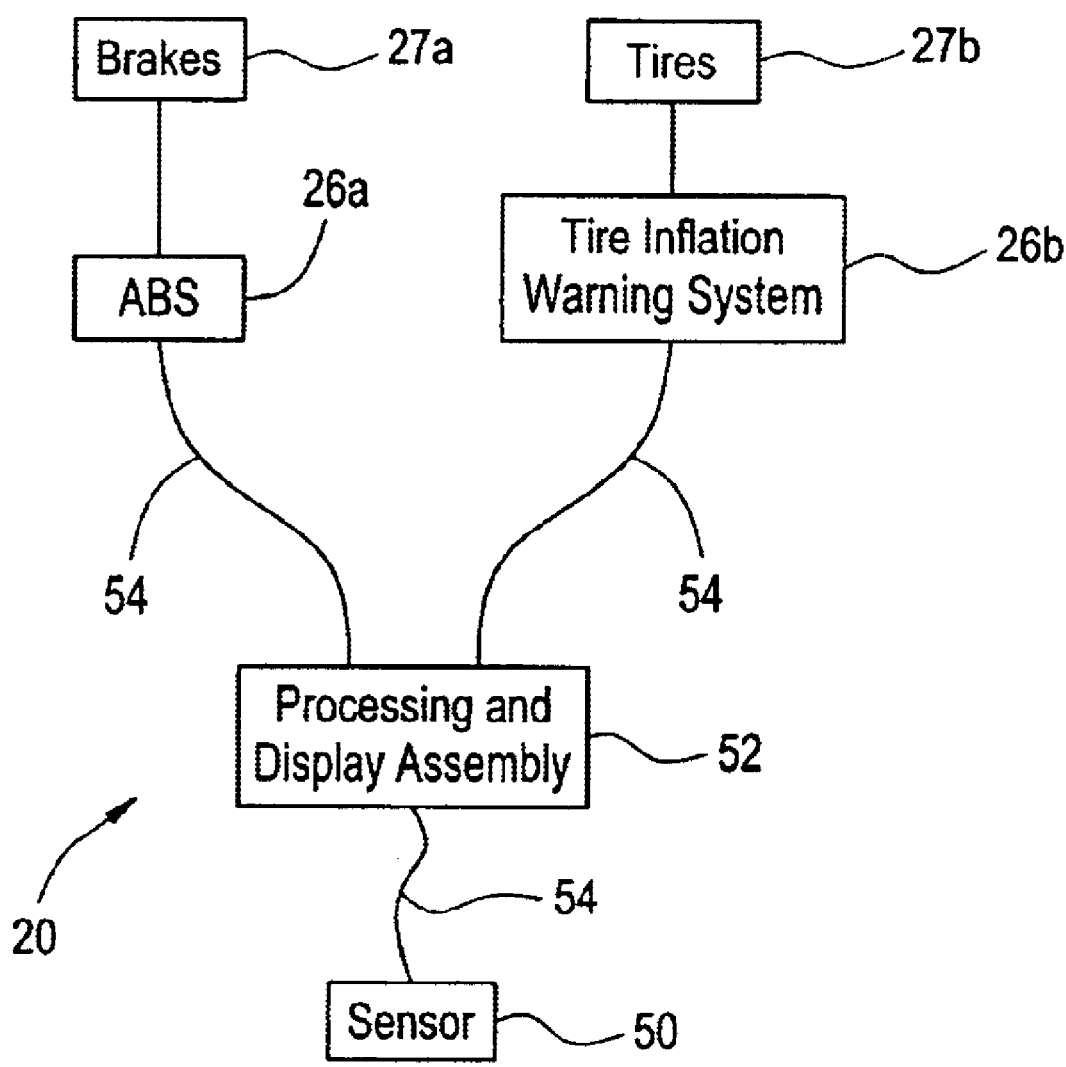
FIG. 7 is a block diagram illustrating the relationship of the components of the system of the present invention.

The wiring 54 connects the sensor 50 to the processing and display assembly 52 in order to relay distance information sensed by the sensor 50 to the processing and display assembly 52 so that the processing and display assembly 52 can process the information and visually display the distance information to the driver in the cab 22. The wiring 54 is also connected to a power circuit (not shown) of the semi-trailer 24 to provide power to the system 20. The wiring 54 is also preferably connected to other systems 26 associated with the semi-trailer 24, such as an anti-lock brake system (ABS) 26a, which is connected to the brakes 27a of the semi-trailer 24, and a tire inflation warning system 26b, which is connected to the tires 27b of the semi-trailer 24, as illustrated in FIG. 7, such that the processing and display assembly 52 can process the information and visually display status information about the other systems 26 of the semi-trailer 24 to the driver.

Figure 3:
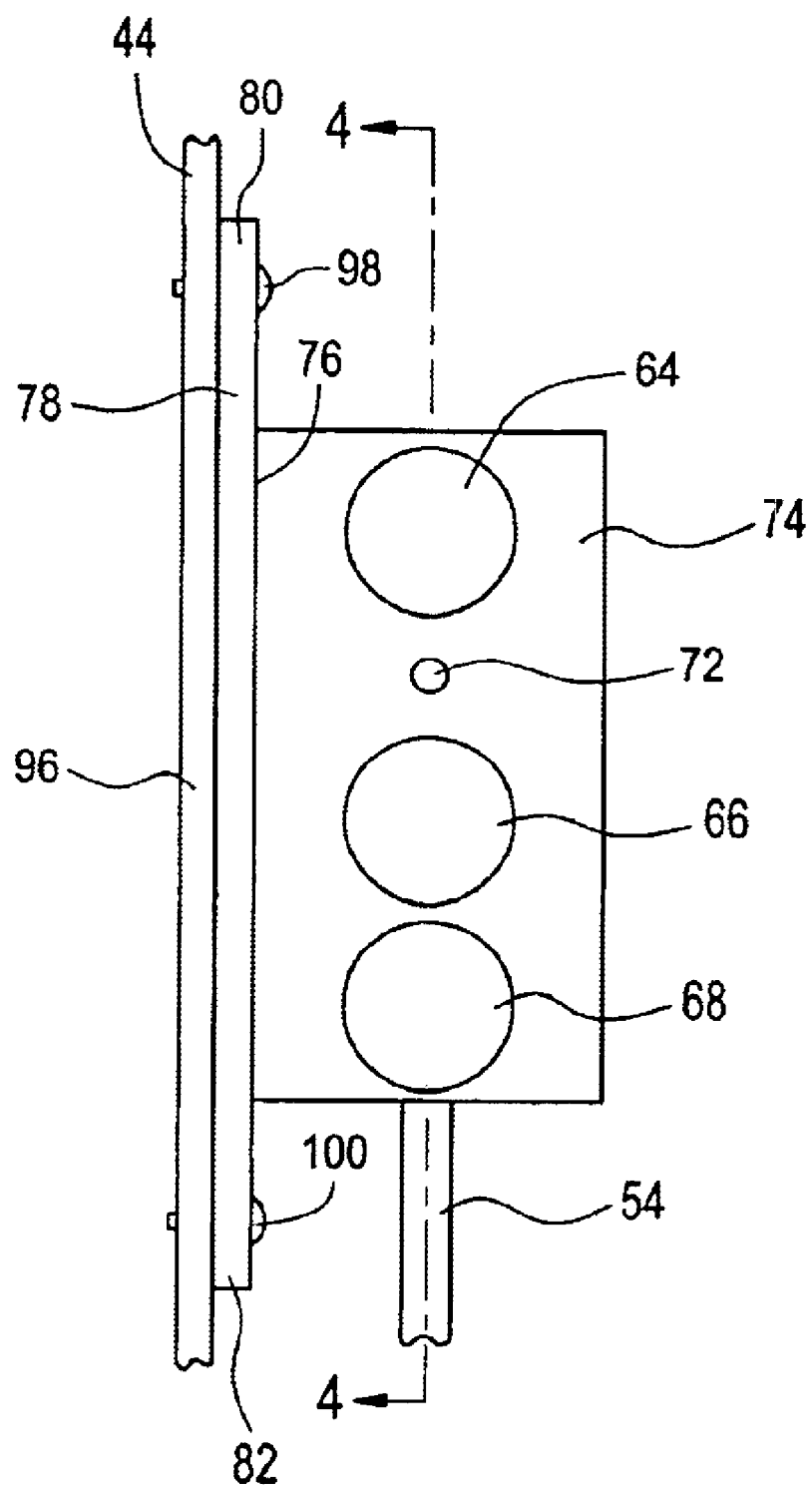
FIG. 3 is a front elevational view of a display unit of the system of the present invention connected to a corner post of a semi-trailer and with the wall of the semi-trailer not shown.
Figure 4:
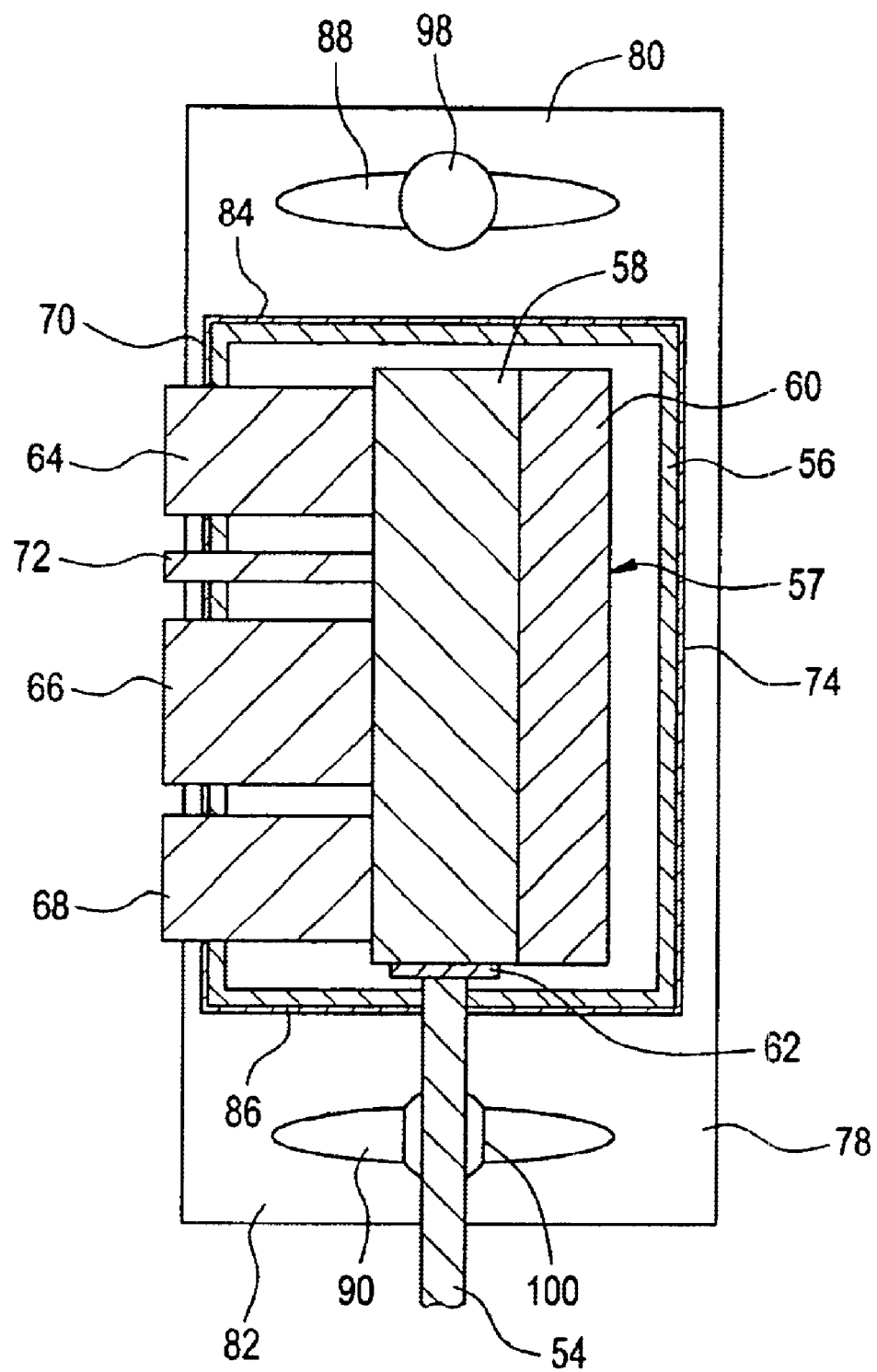
FIG. 4 is a cross-sectional view taken along line 4—4 of FIG. 3.

The processing and display assembly 52 is best illustrated in FIGS. 3 and 4. The processing and display assembly 52 includes a box or housing 56, preferably made of plastic, which houses electronics 57. The electronics 57 includes a printed circuit board 58 and electronic circuitry 60, which may be a microprocessor, that is mounted to the printed circuit board 58 within the box 56. It should be noted that while the electronics 57 is illustrated as being housed within the housing 56, all of the electronics 57 or a portion thereof could be provided remotely from the housing 56 with one of ordinary skill in the art having the knowledge to configure the electronics 57 and the processing and display assembly 52 in such a manner. A connector 62, which is preferably a 12-pin connector, is mounted to the printed circuit board 58. The wiring 54 is connected to the connector 62 such that information from the sensor 50 and the other systems 26 of the semi-trailer is provided to the printed circuit board 58.

Three light emitting diodes 64, 66, 68 are mounted to the printed circuit board 58 and extend through a front side 70 of the box 56, as best illustrated in FIG. 4. The light emitting diode 66 is positioned below the light emitting diode 64. The light emitting diode 68 is positioned below the light emitting diode 66. The light emitting diodes 64, 66, 68 are preferably positioned along a center line of the front side 70 of the box 56.

A photo detector 72 is mounted to the printed circuit board 58 and extends through the front side 70 of the box 56, as best illustrated in FIG. 4. The photo detector 72 is preferably positioned between the light emitting diode 64 and the light emitting diode 66.

The box 56 is encapsulated in an epoxy potting material 74, with only the light emitting diodes 64, 66, 68 and the photo detector 72 exposed.

A side 76 of the box 56 is fastened to a flange 78, which is preferably formed of aluminum, as best illustrated in FIGS. 3 and 4. Ends 80, 82 of the flange 78 extend beyond a top side 84 of the box 56 and a bottom side 86 of the box 56, respectively. Proximate to each end 80, 82, the flange 78 has a hole 88, 90 provided therethrough.

The flange 78 is connected to the corner post 44 of the semi-trailer 24 which is provided within the body 28 of the semi-trailer 24 at the connection of the front wall 32 to the sidewall 30 on the driver's side of the semi-trailer 24. The corner post 44 may be a U-shaped post 44 having three legs 92, 94, 96. The leg 92 is provided along the sidewall 30 of the semi-trailer 24, the leg 94 extends perpendicularly to the leg 92 and is provided along the front wall 32 of the semi-trailer 24, and the leg 96 extends perpendicularly to the leg 94 and parallel to the leg 92. The leg 96 is an inside nose liner flange of the corner post 44 and the flange 78 is connected thereto by fasteners 98, 100 which extend through the holes 88, 90 and into the leg 96.

The leg 94 of the corner post 44 has four holes (not shown) which are cut out of the leg 94 and which are sized to allow the light emitting diodes 64, 66, 68 and the photo detector 72 to shine therethrough, giving a visual indication of status/distance to the driver of the cab 22. The light emitting diodes 64, 66, 68 and the photo detector 72 do not extend beyond an outer surface of the front wall 32/leg 94 of the semi-trailer 24, such that they are recessed in order to eliminate damage thereto from the outside.

Figure 5:
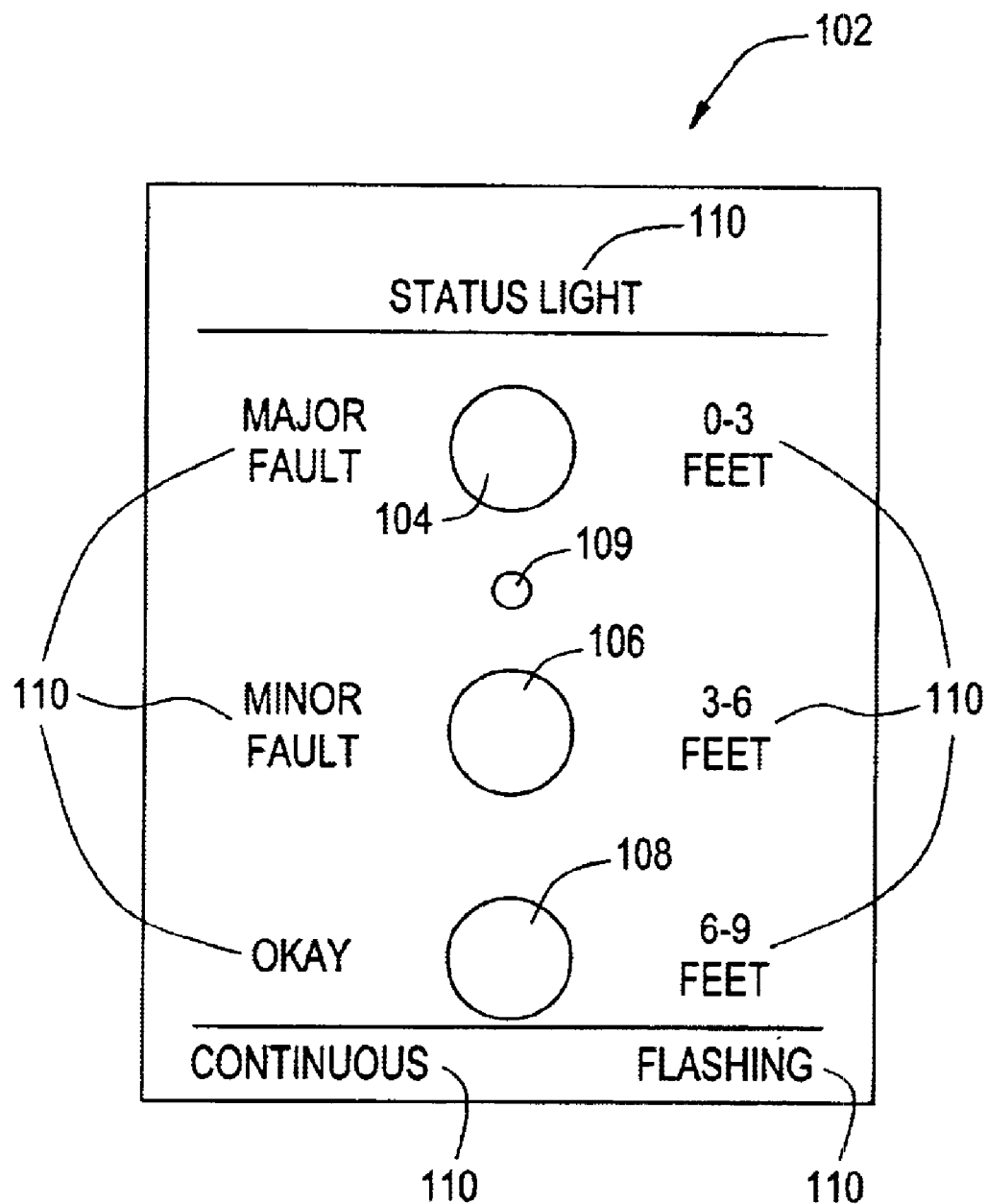
FIG. 5 is a front elevational view of a decal of the system of the present invention.

The processing and display assembly 52 also includes a decal 102, illustrated in FIGS. 2 and 5, which is attached to the outer surface of the front wall 32/leg 94 of the semi-trailer 24 and which covers the holes on the leg 94 of the corner post 44. The decal 102 has a red portion 104 which covers the hole on the leg 96 of the corner post 44 through which the light emitting diode 62 emits light such that the light emitted from the light emitting diode 62 appears to be red to the driver. The decal 102 has a yellow portion 106 which covers the hole on the leg 96 of the corner post 44 through which the light emitting diode 64 emits light such that the light emitted from the light emitting diode 64 appears to be yellow to the driver. The decal 102 has a green portion 108 which covers the hole on the leg 96 of the corner post 44 through which the light emitting diode 66 emits light such that the light emitted from the light emitting diode 66 appears to be green to the driver. The decal 102 has a transparent portion 109 which covers the hole on the leg 96 of the corner post 44 through which the photo detector 72 detects outside light.

The decal 102 indicates text 110 surrounding the red, yellow and green portions 104, 106, 108 thereof. The text 110 includes the words "STATUS LIGHT" above the red portion 104 of the decal 102. To the left of the red portion 104, the text 110 includes the words "MAJOR FAULT" and to the right thereof, the text 110 includes the words "0–3 FEET". To the left of the yellow portion 106, the text 110 includes the words "MINOR FAULT" and to the right thereof, the text 110 includes the words "3–6 FEET". To the left of the green portion 108, the text 110 includes the word "OKAY" and to the right thereof, the text 110 includes the words "6–9 FEET". Below the "OKAY" text 110, the text 110 includes the word "CONTINUOUS" and below the "6–9 FEET" text 110, the text 110 includes the word "FLASHING".

A clear overlay (not shown) is adhered over the decal 102 and overlaps the edges thereof to seal and protect the decal 102 and the holes in the leg 94 of the corner post 44 from, for example, water leakage.

The electronic circuitry 60 can be programmed to cause the diodes 62, 64, 66 to flash at different rates, turn on and off, and shine continuously dependent upon information provided to the electronic circuitry 60 by the sensor 50 and the other systems 26 through the wiring 54. The electronic circuitry 60 can also be programmed to dim the brightness of the light emitted from the diodes 62, 64, 66 dependent upon information provided to the electronic circuitry 60 by the photo detector 72.

The system 20 operates to alert the semi-trailer driver of a distance between a back end of the semi-trailer 24 and an object behind the semi-trailer 24, as well as the status of other systems 26 associated with the semi-trailer 24.

Operation of the system 20 with regard to the distance between a back end of the semi-trailer 24 and an object behind the semi-trailer 24 will first be discussed. The system 20 functions when the semi-trailer 24 is moving in forward and in reverse, such that the driver can determine when an object, such as a vehicle, is close behind the semi-trailer 24 when the semi-trailer 24 is moving forward to alert the driver to tailgating, and with a loading/unloading dock generally being the object when the semi-trailer 24 is moving in reverse.

When the semi-trailer 24 is moving, whether it be in the forward direction or in the reverse direction, the driver can see the decal 102 through a side mirror 112 mounted to the cab 22. When the system 20 is operating normally and the sensor 50 transmits information to the processing and display assembly 52 that there are no objects within nine feet of the back of the semi-trailer 24, the driver will see a steady green light emitted from the processing and display assembly 52 as the light emitting diode 68 steadily shines light through the green portion 108 of the decal 102.

Upon the sensor 50 sensing that an object is within six to nine feet of the back of the semi-trailer 24, the driver will see a flashing green light emitted from the processing and display assembly 52 through the side mirror 112 as the light emitting diode 68 flashingly shines light through the green portion 108 of the decal 102. The flashing green light is emitted next to the "6–9 FEET" text 110.

Upon the sensor 50 sensing that an object is within three to six feet of the back of the semi-trailer 24, the driver will see a flashing yellow light emitted from the processing and display assembly 52 through the side mirror 112 as the light emitting diode 66 flashingly shines light through the yellow portion 106 of the decal 102. The flashing yellow light is emitted next to the "3–6 FEET" text 110.

Upon the sensor 50 sensing that an object is within zero to three feet of the back of the semi-trailer 24, the driver will see a flashing red light emitted from the processing and display assembly 52 through the side mirror 112 as the light emitting diode 64 flashingly shines light through the red portion 104 of the decal 102. The flashing red light is emitted next to the "0–3 FEET" text 110.

The flashing of light provided by the light emitting diodes 64, 66, 68 provides the driver with information that an object is behind the semi-trailer 24 within the distance identified by the text 110 situated to the right of the colored portions 104, 106, 108 provided on the decal 102. The "FLASHING" text 110 on the decal 102 provides a reminder to the driver that flashing lights indicate the back of the semi-trailer 24 is within close proximity to an object behind the semi-trailer 24.

The electronic circuitry 60 provides for the ability of each of the diodes 62, 64, 66 to emit either a continuous or flashing light. This type of circuitry 60 is known in the art.

It should be noted that the performance of the system 20 with regard to the distance behind to an object behind the semi-trailer 24, depends on the number of sensors 50 used. When one sensor 50 is used, the sensor 50 is mounted on the bumper assembly 46 of the semi-trailer 24 on the driver's side thereof. The system 20 will work properly with this setup, but it does allow for a blind spot (an area to the rear of the semi-trailer 24 that is not within the sensor's 50 field of detection) on the passenger side of the semi-trailer 24 where a sensor 50 is not present. If, however, two sensors 50 were used, one on the driver's side of the semi-trailer 24 and one on the passenger side of the semi-trailer 24, the blind spot will be removed such that the entire area directly behind the semi-trailer 24 will be monitored. Wiring (not shown) connects the passenger side sensor (not shown) to the printed circuit board 58.

It should further be noted that the distances described herein which are sensed by the sensor 50 are only suggested distances and other distances can be sensed as desired.

Operation of the system 20 with regard to the status of other systems 26 associated with the semi-trailer 24 will now be discussed. Again, the system 20 functions when the semi-trailer 24 is moving in forward and in reverse. The system 20 monitors the other systems 26 associated with the semi-trailer 24 and provides visual information to the driver of the cab 22 on the status of the other systems 26, such as whether the other systems 26 are running correctly and are running under normal operation, whether the other systems 26 have a minor fault in their operation, such as an ABS or other system malfunction that does not affect the operation of the semi-trailer 24, or whether the other systems 26 have a major fault in their operation, such as wheel temperature of central tire inflation warnings that may affect the operation of the semi-trailer 24.

When the other systems 26 associated with the semi-trailer 24 are operating normally, the driver will see a continuously shining green light emitted from the processing and display assembly 52 through the side mirror 112 as the light emitting diode 68 continuously shines light through the green portion 108 of the decal 102. The continuous green light will be emitted next to the "OKAY" text 110.

When the other systems 26 associated with the semi-trailer 24 are operating with a minor fault, the driver will see a continuously shining yellow light emitted from the processing and display assembly 52 through the side mirror 112 as the light emitting diode 66 continuously shines light through the yellow portion 106 of the decal 102. The continuous yellow light will be emitted next to the "MINOR FAULT" text 110.

When the other systems 26 associated with the semi-trailer 24 are operating with a major fault, the driver will see a continuously shining red light emitted from the processing and display assembly 52 through the side mirror 112 as the light emitting diode 64 continuously shines light through the red portion 104 of the decal 102. The continuous red light will be emitted next to the "MAJOR FAULT" text 110.

The continual emission of light by the light emitting diodes 64, 66, 68 provides the driver with information regarding the status of other systems 26 associated with the semi-trailer 24 by directing the driver's attention to the text 110 situated to the left of the colored portions 104, 106, 108 provided on the decal 102. The "CONTINUOUS" text 110 on the decal 102 provides a reminder to the driver that continuous lights indicate the status of the other systems 26 associated with the semi-trailer 24.

In operation, the system 20 continuously monitors both the distance function and the status system, but when the sensor 50 detects an object behind the semi-trailer 24, the display assembly 52 will operate to display the distance function to the driver of the cab because of the potential of preventing damage to the semi-trailer 24 or to the object behind the semi-trailer 24.

The photo detector 72 senses low light, for example darkness at night. When low light is sensed by the photo detector 72, the light emitted from the light emitting diodes 64, 66, 68 is dimmed in order to reduce brightness to the driver through the side mirror 112, as brightness in the side mirror 112 could potentially be a nuisance to the driver. The electronic circuitry 60 is capable of receiving and processing this information from the photo detector 72 to dim the brightness of the light emitted from the diodes 62, 64, 66.

The system 20 also has other functions to alert different information to the driver. For instance, when the driver starts up the cab 22 such that power is provided to the semi-trailer 24, the light emitting diodes 64, 66, 68 flash in order (green, yellow, red) three times during a normal self-check procedure. Also, the system 20 will flash all three light emitting diodes 64, 66, 68 together when a problem is detected with the sensor 50 or the wire assembly 54 connecting the sensor 50 to the processing and display assembly 52. Such a problem might be detected, for instance, if the processing and display assembly 52 is not receiving information from the sensor 50. After approximately five seconds, the system 20 will revert to reporting only the status of the other systems 26 associated with the semi-trailer 24. Further, if the light emitting diode 68 is rapidly flashing light through the green portion 108 of the decal 102, the driver will know that low voltage is being supplied to the system 20 such that the entire system 20 is not functioning, providing neither information regarding distance or status. The system 20 could detect a low supply of voltage if, for instance, the amount of voltage supplied is below a minimum value stored in the electronics 57.

The system 20 also includes the ability to power the processing and display assembly 52 with two separate inputs (not shown). There is an input line (not shown) that allows the processing and display assembly 52 for distance to be full time on, or only initiated when the semi-trailer 24 is moving in reverse. There are also two input lines (not shown) for the "minor fault" (yellow) status and two input lines (not shown) for the "major fault" (red) status.

The system 20 can also be used independently to display other analog values, such as fuel level. It should be noted that the flashing and continuous roles of the lights could be reversed, if desired.

While a preferred embodiment of the invention is shown and described, it is envisioned that those skilled in the art may devise various modifications without departing from the spirit and scope of the foregoing description and the appended claims.

The invention is claimed as follows:

1. A trailer which is configured to be connected to, and towed by, a cab, said trailer comprising:
    a body having a front end and a back end; and
    a status processing and display assembly associated with said front end of said body, said status processing and display assembly including, electronics and at least one light emitting diode which is connected to said electronics, said at least one light emitting diode configured to emit either a flashing light or a continuous light which is visible by a driver of the cab in order to indicate status information.

2. A trailer as defined in claim 1, further including at least one status system operatively associated with said trailer, said electronics being configured to receive and process status information from said at least one status system.

3. A trailer as defined in claim 2, wherein said electronics are configured to translate said status information into either said flashing light or said continuous light emitted by said at least one light emitting diode.

4. A trailer as defined in claim 3, further including a decal provided on said front end of said trailer, said decal having at least one colored portion which is positioned in front of said at least one light emitting diode such that said flashing or continuous light emitted from said at least one light emitting diode appears to the driver of the cab to be the color of said at least one colored portion of said decal.

5. A trailer as defined in claim 4, wherein said at least one light emitting diode comprises three light emitting diodes, and wherein said at least one colored portion of said decal is three different colored portions of said decal, one of said three different colored portions being positioned in front of one of said light emitting diodes, another one of said three different colored portions being positioned in front of another one of said three light emitting diodes, and a third one of said three different colored portions being positioned in front of a third one of said three light emitting diodes.

6. A trailer as defined in claim 4, wherein said decal has text provided thereon which is visible to the driver of the cab, said text of said decal explaining said flashing or continuous light emitted by said at least one light emitting diode to the driver of the cab in order to provide the driver of the cab with said status information.

7. A trailer as defined in claim 2, wherein said at least one status system is configured to provide a distance from said back-end of said trailer to an object behind said back-end of said trailer.

8. A trailer as defined in claim 7, wherein said at least one status system includes at least one sensor mounted on said back end of said trailer and a wiring assembly which connects said at least one sensor to said electronics.

9. A trailer as defined in claim 8, wherein said at least one sensor is one of an ultrasonic sensor, a laser sensor, an infrared sensor, or a capacitance sensor.

10. A trailer as defined in claim 2, wherein said at least one status system is an anti-lock brake system.

11. A trailer as defined in claim 2, wherein said at least one status system is a tire inflation warning system.

12. A trailer as defined in claim 1, further including a photo detector which is connected to said electronics, said photo detector being configured to adjust a brightness of said flashing and continuous light emitted by said at least one light emitting diode when said photo detector detects a change in an amount of sunlight outside of said trailer.

13. A trailer as defined in claim 1, further including a front wall provided at said front end and a sidewall extending between said front wall and said rear end of said body, and a corner post provided at a connection of said front wall to said sidewall, said status processing and display assembly being secured to said corner post.

14. A trailer as defined in claim 13, wherein said front wall has an exterior surface and wherein said status processing and display assembly does not protrude beyond said exterior surface of said front wall.

15. A trailer as defined in claim 1, wherein said status processing and display assembly includes a housing, said housing being connected to said front end, said electronics being positioned within said housing, said at least one light emitting diode extending through said housing.

16. A trailer which is configured to be connected to, and towed by, a cab, said trailer comprising:
   a body having a front end and a back end;
   means for processing and displaying status information to the driver of the cab, said processing and displaying means being provided at said front end of said body;
   at least one status system operatively associated with said body for providing said status information; and
   means for transferring said status information provided by said at least one status system to said processing and displaying means.

17. A trailer as defined in claim 16, wherein said at least one status system is an anti-lock brake system.

18. A trailer as defined in claim 16, wherein said at least one status system is a tire inflation warning system.

19. A trailer as defined in claim 16, wherein said at least one status system includes at least one sensor operatively associated with said back-end of said trailer proximate to said first sidewall, said sensor configured to determine a distance from said back-end of said trailer to an object behind said trailer.

20. A trailer as defined in claim 16, wherein said processing and displaying means comprises an assembly including electronics and at least one light emitting diode which is mounted to said electronics, said at least one light emitting diode configured to emit either a flashing or continuous light which is visible by the driver of the cab in order to indicate said status information to the driver of the cab, said electronics is configured to receive said status information from said at least one status system and translate said status information into either said flashing or continuous light by said at least one light emitting diode.

21. A trailer as defined in claim 20, wherein said processing and display means includes a decal provided on said front end, said decal having at least one colored portion which is positioned in front of said at least one light emitting diode such that said flashing or continuous light emitted from said at least one light emitting diode appears to the driver of the cab to be the color of said at least one colored portion of said decal.

22. A trailer as defined in claim 21, wherein said at least one light emitting diode is three light emitting diodes, and wherein said at least one colored portion of said decal is three different colored portions of said decal, one of said three different colored portions being positioned in front of one of said three light emitting diodes, another one of said three different colored portions being positioned in front of another one of said three light emitting diodes, and a third one of said three different colored portions being positioned in front of a third one of said three light emitting diodes, said decal has text provided thereon which is visible to the driver of the cab, said text of said decal explaining said flashing light or said continuous light emitted by said at least one light emitting diode to the driver of the cab in order to provide the driver of the cab with said status information.

23. A trailer as defined in claim 20, wherein said processing and display means includes a photo detector which is connected to said electronics, said photo detector being configured to adjust a brightness of said flashing or continuous light emitted by said at least one light emitting diode when said photo detector detects a change in an amount of sunlight outside of said trailer.

24. A method of providing information to a driver of a cab having a trailer connected thereto, the method comprising the steps of:
   a) providing at least one sensor associated with a back end of the trailer;
   b) providing a processing and display assembly associated with a front end of the trailer which is visible to the driver of the cab, said processing and display assembly having at least one light emitting diode capable of emitting either a flashing light or a continuous light which is visible to the driver of the cab;
   c) continuously emitting a light from said at least one light emitting diode when the distance from the back end of the trailer to the object behind the trailer is greater than a predetermined value; and
   d) flashingly emitting a light from said at least one light emitting diode when the distance from the back end of the trailer to the object behind the trailer is less than or equal to the predetermined value.

25. A method as defined in claim 24, further comprising the steps of:
   a) providing an anti-lock brake system associated with the trailer;
   b) emitting a light from said at least one light emitting diode to provide status information relating to said anti-lock brake system to the driver of the cab.

26. A method as defined in claim 24, further comprising the steps of:
   a) providing a tire inflation warning system associated with the trailer;
   b) emitting a light from said at least one light emitting diode to provide status information relating to said tire inflation warning system.

* * * * *

UNITED STATES PATENT AND TRADEMARK OFFICE
CERTIFICATE OF CORRECTION

PATENT NO. : 6,870,473 B2  
DATED : March 22, 2005  
INVENTOR(S) : James B. Brown, Jr.

It is certified that error appears in the above-identified patent and that said Letters Patent is hereby corrected as shown below:

Column 6,
Line 40, "distance behind to" should be -- distance to --.

Signed and Sealed this

Twenty-third Day of August, 2005

JON W. DUDAS
*Director of the United States Patent and Trademark Office*